United States Patent
Cerwin et al.

(10) Patent No.: US 6,495,819 B1
(45) Date of Patent: Dec. 17, 2002

(54) DUAL-INTERFEROMETER METHOD FOR MEASURING BENDING OF MATERIALS

(75) Inventors: Stephen A. Cerwin, San Antonio, TX (US); David B. Chang, Tustin, CA (US)

(73) Assignee: Southwest Research Institute, San Antonio, TX (US)

( * ) Notice: Subject to any disclaimer, the term of this patent is extended or adjusted under 35 U.S.C. 154(b) by 115 days.

(21) Appl. No.: 09/634,553

(22) Filed: Aug. 8, 2000

(51) Int. Cl.[7] .................................................. G01J 4/00
(52) U.S. Cl. ........................ 250/227.19; 250/227.27; 356/35.5
(58) Field of Search ................. 250/227.16, 227.19, 250/227.27; 356/35.5, 477, 480, 482

(56) References Cited

U.S. PATENT DOCUMENTS

| | | | |
|---|---|---|---|
| 4,295,738 A | 10/1981 | Meltz et al. ................... 356/32 |
| 4,459,477 A | 7/1984 | Asawa et al. ................ 250/227 |
| 4,653,906 A | 3/1987 | Dunphy et al. ............... 356/32 |
| 4,729,630 A | 3/1988 | Martinez ................. 350/96.29 |
| 4,734,577 A | 3/1988 | Szuchy ....................... 250/227 |
| 4,927,232 A | 5/1990 | Griffiths ................... 350/96.29 |
| 5,026,141 A | 6/1991 | Griffiths ................... 350/96.29 |
| 5,118,931 A | 6/1992 | Udd et al. .............. 250/227.16 |
| 5,301,001 A | * 4/1994 | Murphy et al. ........ 250/227.27 |
| 5,555,086 A | * 9/1996 | vonBieren et al. ...... 250/227.27 |
| 5,633,494 A | 5/1997 | Danisch ................. 250/227.16 |
| 5,682,237 A | * 10/1997 | Belk .......................... 356/35.5 |
| 6,057,911 A | * 4/2000 | Reich ........................ 356/35.5 |

* cited by examiner

Primary Examiner—Stephone Allen
Assistant Examiner—Bradford Hill
(74) Attorney, Agent, or Firm—Baker Botts L.L.P.

(57) ABSTRACT

A method of two interferometric configurations to measure bending of an extended element. The measurement arm of each configuration is a long optical fiber. A first interferometric configuration has a segment of its measurement arm attached to one side of the element. The second interferometric configuration has a segment of its measurement arm attached to one side of the element and another segment of its measurement arm attached to an opposing side of the element. The two configurations are used to obtain two sets of interference fringe measurement values. If one set is subtracted from the other, the result is intensity differential values that indicate only the effects of bending and not of temperature or pressure. Variations of the method can be used for irregularly shaped elements.

12 Claims, 2 Drawing Sheets

DUAL-INTERFEROMETER METHOD FOR MEASURING BENDING OF MATERIALS

TECHNICAL FIELD OF THE INVENTION

This invention relates to instruments for measuring bending deformation in materials, and more particularly to a fiber optic interferometric method for such measurements.

BACKGROUND OF THE INVENTION

Many situations exist in which it is desired to measure the deformation or orientation of structures and structural members. Examples of such situations are the monitoring of buildings and bridges for safety, feedback control of buildings for the prevention of earthquake damage, guidance and location of drills in geophysical exploration and oil production, disaster prevention in mines, tolerance maintenance in manufacturing processes, and monitoring and control in the assembly of structures.

In some cases, the environment in which the measurement is required can be somewhat hostile. For example, there may be corrosive chemicals present, or the structures may be subjected to high temperatures and pressures, or there may be electromagnetic interference. Accordingly, there is a need for a structural monitor that is chemically inert, insensitive to temperature and pressure, and operable in the presence of electromagnetic interference.

One approach to measuring structural bending is fiber optic interferometry. Fiber optic sensors make use of the phase modulation experienced by light propagating through an optical fiber that is exposed to an external environment. The phase modulation is interferometrically retrieved and processed to determine a desired characteristic of that environment. When properly configured relative to a certain material or surface, any external disturbance that affects the length of the fiber, such as strain, pressure, temperature, acoustics, or vibration, causes a phase change in the detected light signal.

An advantage to the fiber optic interferometric approach is that silica fiber is chemically inert. Also, freedom from electromagnetic interference can be achieved by placing the associated electronics remote from the monitoring site. However, sensitivity to pressure and temperature can be problematic.

Two basic techniques have been used to eliminate pressure and temperature induced changes. In one technique, an attempt is made to shield the fibers from pressure variations and to insulate the fibers from temperature changes. In the other technique, an attempt is made to monitor the pressure and temperature changes, and to subtract out these effects. For interferometric measurements of strain on extended structures, both of these techniques can be hard to implement because shielding and monitoring must be done over large expanses of material.

SUMMARY OF THE INVENTION

One aspect of the invention is a method of using two interferometric configurations to measure bending of an extended structural element. The two configurations can be two interferometers, or the same interferometer with two different measurement arms. First, a segment of a first optical fiber is attached along one side of the element, the first optical fiber comprising the measurement arm of a first interferometric configuration. A set of interference fringe values from the first interferometric configuration is obtained. Next, a segment of a second optical fiber is attached along one side of the element and another segment of the same fiber along the opposing side of the element, the second optical fiber comprising the measurement arm of a second interferometric configuration. A set of interference fringe values is obtained from the second interferometric configuration. The second set of interference fringe values is subtracted from the first set of interference fringe values, to yield a set of intensity difference values that indicates only the effects of bending and not temperature or pressure. Bending and bend-induced strain can be calculated from these values.

Advantages of fiber interferometric measurement of bending are its sensitivity, inertness to harsh chemical environments, and freedom from electromagnetic interference. Additionally, the invention is an improvement over previous fiber optic interferometric methods because the effects of temperature and pressure are intrinsically eliminated, that is, without the need for shielding or special processing. Also, because the optical fibers are attached to the beam along its length, the measurement is a global rather than a local one.

DETAILED DESCRIPTION OF THE INVENTION

General Principles of Fiber Optic Interferometry for Measuring Bending of Materials In general, for measuring bending in materials, at least one optical fiber is attached to the material of interest to form a measurement arm of an interferometer. A Michelson type interferometer or a Mach-Zehnder type interferometer also has a reference arm.

Sensitivity of the interferometer is proportional to the ratio of the length of the optical fiber to the wavelength of the guided light. This arises from the expression for the intensity, I, of the light received when the light beams from the two interferometer arms are combined:

$$I = I_0[1 + v \cos \phi] \qquad [1]$$

Intensity, I, is determined by the source power and by losses in the system. The visibility, v, depends on polarization differences between the interfering beams, the splitting ratio of couplers, and the source coherence properties. The phase difference, $\phi$, depends on the difference in the optical path lengths of the two arms. Thus, if the velocity of propagation of the light in the two arms is denoted by c, the wavelength of the light in the fiber by $\lambda$, and the difference in path lengths by L, then:

$$\phi = 2\pi \Delta L / \lambda \qquad [2]$$

A strain-induced change in the phase difference, $\phi$, will generally be proportional to the lengths of the arms, because the change in $\Delta L$ is proportional to the lengths. Thus:

$$\delta\phi \propto \Delta \delta L/\lambda \quad [3]$$

$$\propto L/\lambda$$

Within the interferometric approach, a number of techniques have been developed, differing in the use of source frequency variation and-polarization. For example, the source frequency can be chirped, a broadband source can be used with RF subcarrier modulation, mode spacing can be varied in a dual-frequency source, and polarization differences can be used.

Although interferometric techniques are sensitive means of measuring bend-induced strain, strain can also be induced by external pressure changes and by temperature changes. For example, for quartz, the Young's modulus Y is:

$$Y = 7.17 \times 10^{11} \text{ dynes/cm}$$

and the coefficient of thermal expansion $\alpha$ is:

$$a = 5.5 \times 10 \text{ cm/cmK}$$

This results in sizable fringe shifts for modest temperature and pressure changes.

Dual Interferometer Configurations for Measuring Bending

Figure 1:
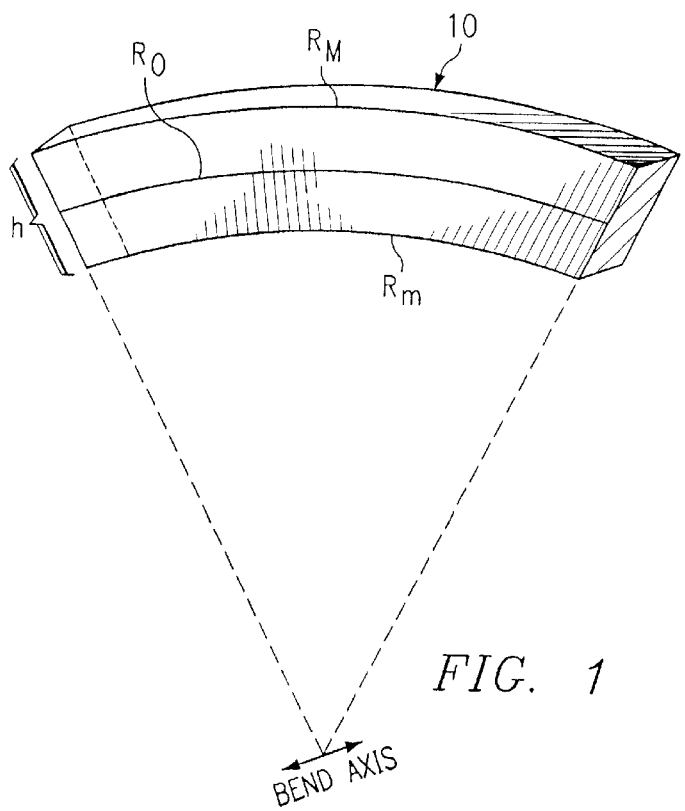
FIG. 1 illustrates a beam whose bending is to be measured in accordance with the invention.

FIG. 1 illustrates a bent beam 10, whose bending is to be measured in accordance with the invention. For purposes of this description, a "beam" is any extended structural member, and may hollow as well as solid. For example, for purposes of this description, a pipe is included in the definition of beam.

When beam 10 bends, there is an "medial" surface at some radius $R_o$. about the bending axis whose length does not change. At an outer surface at a larger radii, the length of the beam 10 increases. At an inner surface at smaller radii, the length of the beam 10 decreases. In FIG. 1, the outermost radius is designated $R_M$ and the innermost radius is designated $R_m$.

To simplify the following discussion, it is assumed that $R_M - R_o = R_o - R_m = h/2$, where h is the thickness of the beam. The concepts discussed herein can be easily extended to more general cases, and to beams having any cross sectional geometry, whether regular or irregular.

As explained below, the invention is based on obtaining two sets of interference fringe intensity measurements. Each set is obtained by interfering two beams of light. A first set of measurements represents the extension of the beam at the radius $R_M$. A second set of measurements represents the sum of the extensions of the beam at the two radii $R_M$ and $R_m$. In general, the extension at the radius $R_M$, will be due to the effects of temperature and pressure changes as well as to the bending. However, the sum of the extensions of the beam at the two radii, $R_M$ and $R_m$, is due only to the effects of temperature and pressure. Bending does not contribute to this sum, because the elongation of the beam at the radius $R_M$ is canceled by the contraction of the beam at the radius $R_m$. These measurements are accomplished using two different types of interferometric fiber optic configurations.

Figure 2:
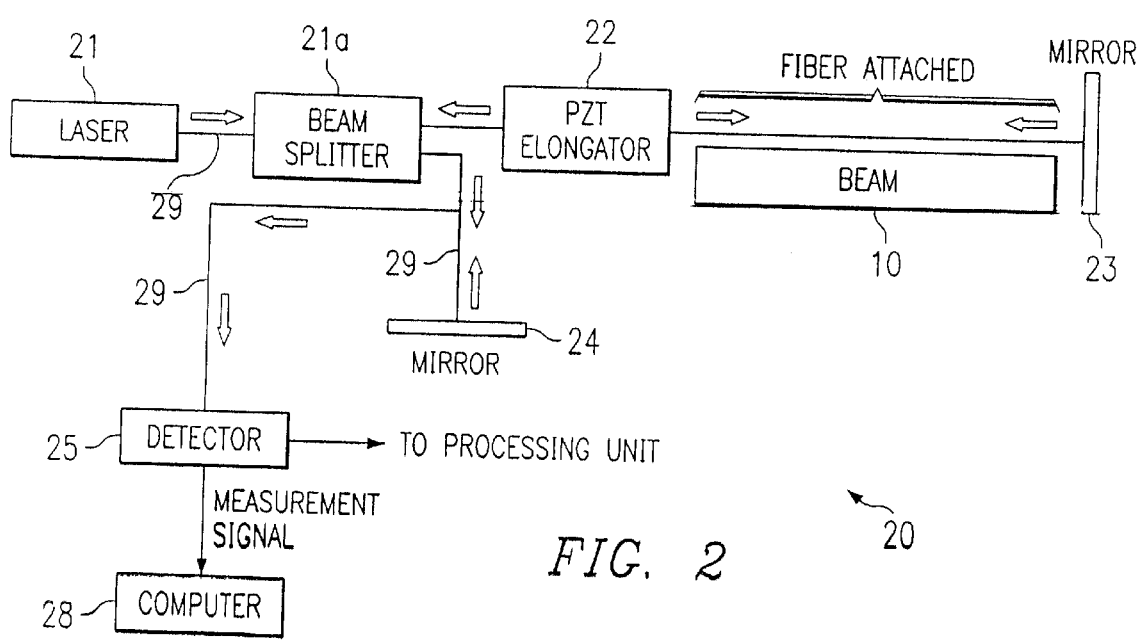
FIG. 2 illustrates an interferometer configured for "one-sided" measurement with its measurement arm.

FIG. 2 illustrates a Michelson interferometer 20 configured to obtain a first set of interference fringe measurements. Interferometer 20 has a very short reference arm. A long measurement arm of interferometer 20 is attached along the surface of beam 10 at radius $R_M$. This configuration of interferometer 20 measures the effects of temperature, pressure, and bending. Because the measurement arm is attached along only one side of beam 10, interferometer 20 may be described as having a "one-sided" configuration of its measurement arm.

Figure 3:
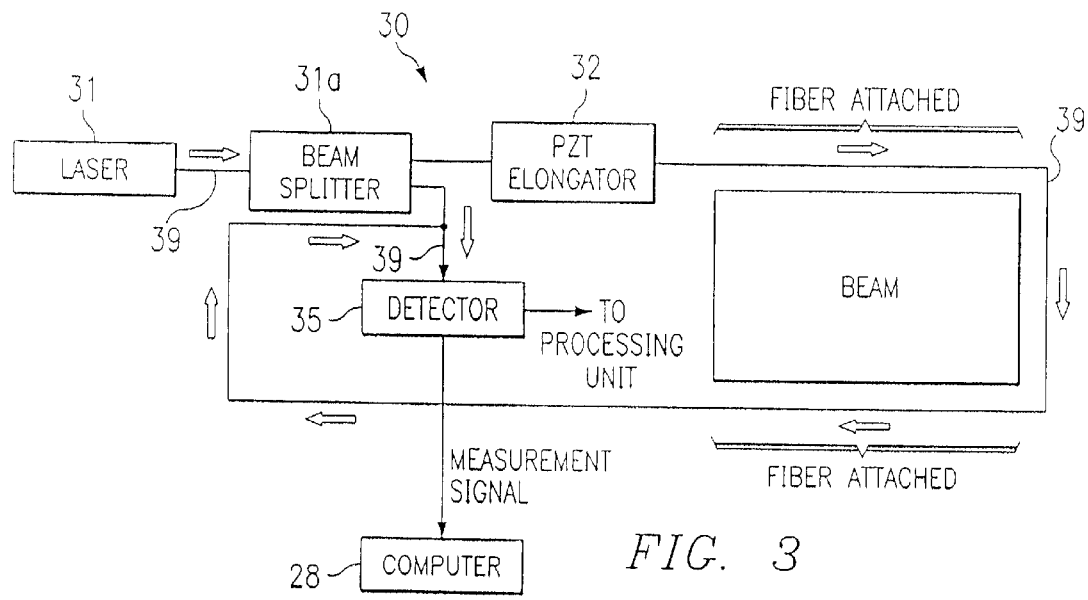
FIG. 3 illustrates an interferometer configured for "two-sided" measurement with its measurement arm.

FIG. 3 illustrates a Mach-Zehnder interferometer 30 configured to obtain a second set of interference fringe measurements. Like interferometer 20, interferometer 30 has a very short reference arm. The long measurement arm of interferometer 30 is attached along the beam surface at radius $R_M$ and also along the beam surface at radius $R_m$. In other words, the measurement arm has two segments that are attached to beam 10, on opposing sides of the beam. Generally, it will be desired to attach one of the segments substantially coincident with that of the configuration of FIG. 2. Also, all of the attached segments are typically desired to be substantially equal in length. Interferometer 30 measures the effects of only temperature and pressure. Because the measurement arm is attached on two sides of beam 10, interferometer 30 may be described as having a "two-sided" configuration of its measurement arm.

FIGS. 2 and 3 illustrate various optical and electrical components for fiber optic interferometry: laser sources 21 and 31, beam splitters 21a and 31a, photodetectors 25 and 35, fibers 29 and 39, PZT (lead zirconate titanate) elongators 22 and 32, and mirrors 23 and 24 (which can be silvered fiber ends). This equipment can be conventional opto-electric interferometric equipment.

FIGS. 2 and 3 are intended to illustrate primarily the optical paths of the measurement arms of interferometers 20 and 30, that is, the placement of optical fibers 29 and 39 relative to beam 10. The computing equipment 28 used to record the intensities measured by the detectors 25 and 35, to count the fringe shifts, and to convert this information to information about bending and bend-induced strain, is discussed below in connection with FIG. 5.

Each interferometer 20 and 30 has a beam splitter 21a and 31a, respectively, for splitting the beam out of the source laser 21 or 31 into the reference arm and the measurement arm of the optical path. As indicated, the reference arm is a short path, bypassing the beam 10 under test. For interferometer 20, the reference arm provides an optical path to mirror 24 and to detector 25. For interferometer 30, the reference arm provides an optical path to detector 35.

The measurement arm (also referred to herein as the "long" arm) of each interferometer provides an optical path along optical fiber that is attached to beam 10. The attachment of the optical fiber 29 or 39 to beam 10 may be by various means. For example, the fiber may be glued or clipped to the beam 10. Or, the fiber may be embedded in beam 10. The attachment need not be continuous along the entire length of the fiber; experimentation has determined that spaced points of attachment are sufficient. The length of optical fiber attached to beam 10 may vary depending on the length of the portion of beam 10 desired to be tested.

For both interferometers 20 and 30, PZT elongators 22 and 32 permit a section of the fiber 29 or 39 to be elongated at will. As is known in fiber optic interferometers, the purpose of such elongation is to remove ambiguity as to whether the phase of the fringe is a particular value (modulo $2\pi$) or that particular value plus $\pi$. The PZT elongator 22 or 32 is an electro-optic device, which can consist of a piezo-electric spool about which a section of the fiber is wound. Application of voltage to the PZT elongator 22 or 32 results in a change in length of that section of the fiber. The optical path length change in that section is about 78% of the physical change in the length, due to the 22% change in the index of refraction given by the Poisson ratio of the fiber.

There are various alternatives to this electro-optic means of removing the phase ambiguity, such as a two-frequency, chirped, or modulated laser source.

As stated above, interferometers 20 and 30 are used to obtain two sets of interference fringes, with the two sets of interference fringes providing the means of subtracting out the effects of pressure and temperature. More specifically, optical fibers 29 and 39 are attached to beam 10 in two different configurations, each of which yields one of the two sets of interference fringes. One set indicates only pressure and temperature changes and not bending. The other set indicates bending as well as pressure and temperature changes. Subtraction of one set of fringe shifts from the other gives the desired bending information. There is no need for the pressure and temperature to be uniform over the entire structure in order for the subtraction to occur.

In operation, the long measurement arms of interferometers 20 and 30 may be both attached to beam 10 at the same time. Thus, the optical fiber 29 of the Michelson interferometer 20 could be attached to one side of beam 10. At the same time, the optical fiber 39 of the Mach-Zehnder interferometer 30 could be attached to both sides of beam 10. In alternative embodiments, the long arm configurations could be reversed such that interferometer 20 has its long arm attached to both sides of beam 10 and interferometer 30 has its long arm attached to only one side.

The use of one Michelson and one Mach-Zehnder type interferometer is not essential to the invention; various combinations of interferometers could be used. For example, the Mach-Zehnder interferometer 30 could be replaced by a second Michelson interferometer, such that two Michelson interferometers are used, each having one of the two different measurement arm configurations described above. Or, two Mach-Zehnder interferometers 30 could be used. Other types of interferometers could be used, such as a Fabry-Perot, which does not require a reference arm.

Figure 4:
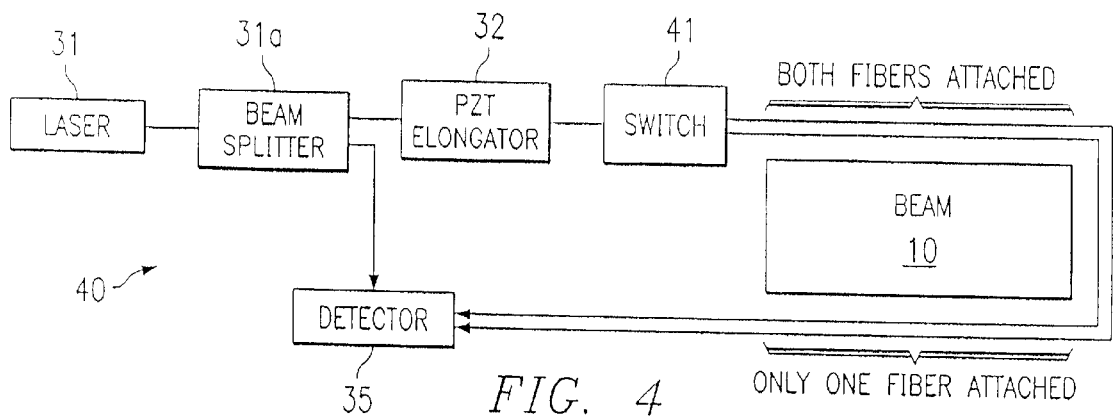
FIG. 4 illustrates an interferometer configured for both "one-sided" and "two-sided" measurement.

FIG. 4 illustrates an alternative approach to providing the two interferometer configurations. Here, the two configurations are achieved by using the same opto-electronic equipment with two different measurement arms. In other words, a single interferometer 20 or 30 could be used, with a switch for switching between optical fibers 29 and 39 for the two measurements arms. In the example of FIG. 4, a Mach-Zehnder interferometer 30 has been configured with two measurement arms and a switch 41 for switching between them. In still another embodiment, a single interferometer could be used, as in FIG. 4, but with a single measurement arm that is always attached to a first side of beam 10. The same fiber could be removably attached to the opposing side of beam 10. A first set of interference fringe measurements could be acquired with the fiber attached to only one side; a second set could be acquired with the fiber attached to both sides.

In general, all that is required is two interferometer "configurations", each having one of the two different measurement arms described above. As explained below, the two different configurations provide a means of subtracting out the effects of temperature and pressure along the measured length of the beam.

Measurement Data Processing

Figure 5:
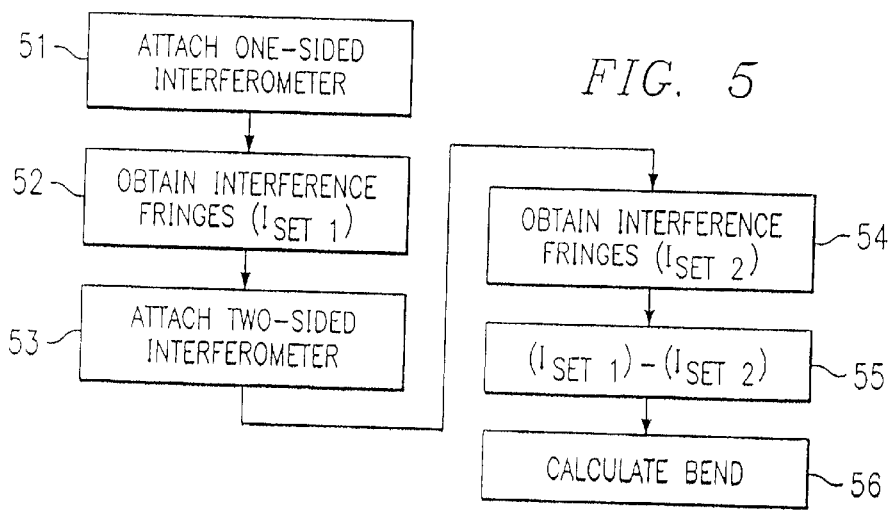
FIG. 5 illustrates a method of using dual interferometer configurations to measure bending in accordance with the invention.

FIG. 5 illustrates a method of measuring bending in accordance with the invention. As in the above discussion, the element to be measured may be any extended element, or "beam".

In Step 51, a first interferometer configuration is attached to the beam. This first interferometer system is a "one-sided" configuration, with a segment of its long (measurement) arm attached to one side of the beam. FIG. 2 is an example of a one-sided interferometric configuration.

In Step 52, a first set of interference fringe measurements is obtained, using the configuration of Step 51.

In Step 53, a second interferometer configuration is attached to the beam. This second interferometer system is a "two-sided" configuration, with segments of its long (measurement) arm attached to opposing sides of the beam. FIG. 3 is an example of a two-sided interferometric configuration.

In Step 54, a second set of interference fringe measurements is obtained, using the configuration of Step 53.

Steps 55 and 56 are processing steps, performed with computer 28, which receives the measurement signal from detector 25 or 35. It is assumed that computer 28 has appropriate processing resources and programming for performing the calculations discussed herein.

In Step 55, the intensity values from Step 54 are subtracted from those of Step 53. The governing equations for the two interferometric configurations are Equations [1] and [2], where $\Delta L$ is the path difference between the measuring arm and the short reference arm. Denoting the $\Delta L$ for the first interferometer by $\Delta L_1$, and that for the second interferometer by $\Delta L_2$, Equations [1] and [2] give:

$$I_1 = I_{o1}[+1+v_1 \cos(k\Delta L_1)] \quad [4]$$

$$I_2 = I_{o2}[+1+v_2 \cos(k\Delta L_2)] \quad [5]$$

for interferometers 20 and 30, respectively, where $$k = 2\pi/\lambda \quad [6]$$

For each interferometer, the changes in the $\Delta L$'s due to temperature, pressure, and bending are:

$$\delta \Delta L_1 = A\Delta L_1 + B\Delta L_1 \quad [7]$$

$$\delta \Delta L_2 = A\Delta L_2 \quad [8]$$

where A and B are expressed in terms of the thermal coefficient of expansion $\alpha$, Young's modulus Y, the average change in temperature along the beam $\delta T$, the average change in pressure along the beam $\delta P$, the thickness h of the beam along the bend radius, and the radius of curvature of the beam R, such that:

$$A = \alpha \delta T + (1/Y)\delta P \quad [9]$$

$$B = h/2R_o \quad [10]$$

These result in changes in the measured fringe shift intensities:

$$\delta I_1 = I_{o1} k v_1 \sin(k\Delta L_1) \delta \Delta L_1 \quad [11]$$

$$\delta I_2 = I_{o2} k v_2 \sin(k\Delta L_2) \delta \Delta L_2 \quad [12]$$

Equations [4] through [12] provide the basis for determining the bend radius $R_o$, which is the desired objective.

In Step 56, the bend is calculated. These calculations include various calculations discussed above to obtain the bend radius from the intensity difference. The visibilities, $v_1$ and $v_2$, can be determined by observing the maximum amplitude variations of the interference fringes as conditions change.

The phase modulus may be determined as follows. At any moment, the fringe intensities, $I_1$ and $I_2$, give $\cos(k\Delta L_1)$ and $\cos(k\Delta L_2)$. However, the signs of the corresponding $\sin(k\Delta L_1)$ and $\sin(k\Delta L_2)$ are not defined unambiguously by the fringe intensities $I_1$ and $I_2$. To determine these, PZT elongator 22 or 32 is activated so that the change in the fringe intensities can be determined for a known increase in optical path length. By observing whether the fringe intensities increase or decrease, the signs are unambiguously determined.

The change due to temperature and pressure changes, A, is determined by observing any subsequent change in the fringe intensity of the "two-sided" interferometric configuration and using Equations [8] and [12]. Because A is related to temperature and pressure changes through Equation [9], this determines the direct effect of any temperature and pressure changes along the beam 10.

The change in the bend radius, $R_o$, can be monitored in real time. Any subsequent change in the fringe intensity of the "one-sided" interferometric configuration is determined through Equations [7] and [12]. Because A in Equation [7] is already known from the "two-sided" interferometric configuration, this then gives B. Through Equation [10], this yields the desired radius of curvature $R_o$.

The above-described method, with the above-described dual-interferometer configuration, is best applied when the pressure and temperature are the substantially the same on both the top and bottom of the beam 10. This would most likely be the case for long thin beams, such as pipes. Variations along the beam present no problem.

If beam 10 is twisted as well as bent, the above-described method is useful, so long as the twist is small. However, if the twisting is great enough for the fibers to complete one or more helical turns, the effects of bending could be difficult to measure.

Bending about an axis that is not horizontal can be accommodated by affixing another pair of fibers along the beam sides. For bending about an axis that is at an angle e with respect to the perpendicular to the plane formed by a pair of fibers, the h in Equation [10] is replaced by h cos θ.

Although the foregoing has been discussed for a simple beam 10, the extension of the method to more complicated beams is straightforward. Two surfaces can be determined where the effects of bending are canceled and the interference fringes indicate only the effects of temperature and pressure. Or, a surface could be determined where no elongation occurs due to bending. In either case, optical fibers could be attached or embedded at those surfaces, where a "surface" can be at any depth as in FIG. 1 above. Or, if this is impractical, the equation for the second interferometer can be modified to include a B term also, in which case two simultaneous equations are used to solve for A and B.

Other Embodiments

Although the present invention has been described in detail, it should be understood that various changes, substitutions, and alterations can be made hereto without departing from the spirit and scope of the invention as defined by the appended claims.

What is claimed is:

1. A method of using two interferometric configurations to measure bending of an extended structural element, comprising the steps of:

attaching a segment of a first optical fiber along one side of the element, the first optical fiber comprising the measurement arm of a first interferometric configuration, the first interferometric configuration having a reference arm and selected from the group consisting of a Michelson or Mach-Zehnder interferometer;

obtaining a set of interference fringe values from the first interferometric configuration;

attaching a segment of a second optical fiber along one side of the element and another segment of the second optical fiber along the opposing side of the element, the second optical fiber comprising the measurement arm of a second interferometric configuration, the second interferometric configuration having a reference arm and selected from the group consisting of a Michelson or Mach-Zehnder interferometer;

obtaining a set of interference fringe values from the second interferometer configuration;

subtracting the second set of interference fringe values from the first set of interference fringe values; and calculating bending of the element based on the results of the subtracting step.

2. The method of claim 1, wherein the first interferometric configuration and the second interferometric configuration share at least one element other than their measurement arms.

3. The method of claim 1, wherein the first interferometric configuration and the second interferometric configuration are two different interferometers.

4. The method of claim 3, wherein the two different interferometers are different types of interferometers.

5. The method of claim 1, wherein the first interferometric configuration and the second interferometric configuration share at least one element, and further comprising the step of switching from the first optical fiber to the second optical fiber to perform the step of obtaining interference fringe values from the second interferometric configuration.

6. The method of claim 1, wherein at least one of the attaching steps is performed by embedding the optical fiber in the element.

7. The method of claim 1, wherein the steps are repeated over a period of time, such that bending is continuously monitored during such time.

8. A method of using two interferometric configurations to measure bending of an extended structural element, comprising the steps of:

determining a pair of surfaces of the element, along which the effects of bending are canceled;

attaching a segment of a first optical fiber along a first of the two surfaces, the first optical fiber comprising the measurement arm of a first interferometric configuration;

obtaining a set of interference fringe values from the first interferometric configuration;

attaching a segment of a second optical fiber along the first of the two surfaces and another segment of the second optical fiber along the second of the two surfaces, the second optical fiber comprising the measurement arm of a second interferometric configuration;

obtaining a set of interference fringe values from the second interferometer configuration;

subtracting the second set of interference fringe values from the first set of interference fringe values; and calculating bending of the element based on the results of the subtracting step.

9. The method of claim 8, wherein the first and the second interferometric configurations each have a reference arm and selected from the group consisting of a Michelson or Mach-Zehnder interferometer.

10. A method of using two interferometric configurations to measure bending of an extended structural element, comprising the steps of:

attaching a segment of a first optical fiber along one side of the element, the first optical fiber comprising the measurement arm of a first interferometric configuration;

obtaining a set of interference fringe values from the first interferometric configuration;

determining a surface of the element along which no length difference occurs due to bending of the element;

attaching a segment of a second optical fiber along the surface determined by the preceding step, the second optical fiber comprising the measurement arm of a second interferometric configuration;

obtaining a set of interference fringe values from the second interferometer configuration;

subtracting the second set of interference fringe values from the first set of interference fringe values; and calculating bending of the element based on the results of the subtracting step.

11. The method of claim 10, wherein the first and the second interferometric configurations each have a reference arm and selected from the group consisting of a Michelson or Mach-Zehnder interferometer.

12. A method of using two interferometric configurations to measure bending of an extended structural element, comprising the steps of:

attaching a segment of a first optical fiber along one side of the element, the first optical fiber comprising the measurement arm of a first interferometric configuration, the first interferometric configuration having a reference arm and selected from the group consisting of a Michelson or Mach-Zehnder interferometer;

obtaining a set of interference fringe values from the first interferometric configuration;

attaching a segment of a second optical fiber along one side of the element and another segment of the second optical fiber along the opposing side of the element, the second optical fiber comprising the measurement arm of a second interferometric configuration, the second interferometric configuration having a reference arm and selected from the group consisting of a Michelson or Mach-Zehnder interferometer;

obtaining a set of interference fringe values from the second interferometer configuration;

simultaneously solving equations representing the relationship among the interference fringe values and bending, temperature, and pressure; and calculating bending of the element based on the results of the solving step.

* * * * *